3,143,519
SILICONE RUBBERS CONTAINING ALIPHATIC DIKETONES, KETO ALCOHOLS AND KETONE ACID ESTERS
Siegfried Nitzsche and Manfred Wick, Burghausen, Bavaria, Germany, assignors to Wacker-Chemie G.m.b.H., Munich, Bavaria, Germany
No Drawing. Filed June 17, 1960, Ser. No. 36,714
Claims priority, application Germany June 30, 1959
5 Claims. (Cl. 260—37)

This invention relates to molded articles of silicone rubber which are chemically inert.

The development of antibiotics such as penicillin, streptomycin, dihydrostreptomycin and a host of others has led to new problems in packaging of pharmaceuticals. Glass containers in which the antibiotics are often stored are frequently sealed with rubber stoppers which can be pierced by an injection needle so that by injecting water a satisfactory solution may be prepared in the container and the injection syringe may be filled therefrom.

The antibiotics, and particularly dihydrostreptomycin, are chemically very sensitive and reactive. When these chemically reactive materials are stored for extended periods of time under unfavorable climatic conditions it is found a chemical reaction generally results between the antibiotic and the rubber stopper. It is believed the accelerators, anti-aging agents, softeners and other additives in the rubber stopper display distinct chemical activity toward the antibiotic. The results of the chemical change in the antibiotic are obvious when it comes time to use the material. As is usual, the injection needle is employed to pierce the stopper and a carefully measured quantity of distilled water is added through the syringe and needle into the antibiotic material. The antibiotic must form a water-clear solution to be acceptable but the material altered chemically through contact with the rubber stopper forms turbid solutions with distilled water and such material is unsuitable for use.

The introduction of rubber stoppers prepared from silicone rubber stocks based on organosiloxane polymers brought a measure of relief to this field because the silicone rubbers are free of softeners and generally are free of anti-aging agents and the like. Nevertheless, it was found that silicone rubber stoppers were not absolutely chemically inert to certain antibiotics and particularly to the very sensitive materials such as dihydrostreptomycin. On prolonged storage and particularly on storage at elevated temperatures, the dihydrostreptomycin reacts with the silicone rubber and the complete solubility required of such materials is reduced to the point where the antibiotic becomes useless. Thus, when shreds of silicone rubber stopper are brought into contact with pulverulent dihydrostreptomycin and the mixture is stored at 45° to 60° C. for a few weeks, the dihydrostreptomycin will no longer dissolve in distilled water to form a water-clear solution but forms only an unusable turbid solution. By contrast, dihydrostreptomycin sealed in glass ampoules and similarly stored at 45° to 60° C. will form water-clear solutions with distilled water at the end of the storage period.

It is an object of this invention to provide rubber stoppers for use in containers for storage of antibiotics. A rubber material chemically inert to even the most sensitive of antibiotics is the broad object of this invention. Other objects of the invention are detailed in or will be apparent from the disclosure and claims following.

This invention comprises adding a complex-forming material or a chelate-forming material to a peroxide vulcanized silicone rubber stock prior to vulcanization and cure of the stock.

The complex- and chelate-formers are well known from organic chemistry and include diketones such as diacetyl and acetyl acetone; keto acid esters such as acetoacetic ester; oximes such as diacetyldioxime and α-benzoinoxime; heterocyclic nitrogen compounds such as α,α'-dipyridyl and 8-oxy-quinoline; nitroso compounds such as α-nitroso-β-naphthol and dinitrosoresorcin; carbazones and carbazides such as diphenylthiocarbazone and sym-diphenylcarbazide; amino compounds such as anthranilic acid, ureas, ethylenediaminetetraacetic acid and thioureas.

For physiological reasons and for reasons of solubility, complex-formers and chelate-formers free of nitrogen and sulfur are preferred. The preferred additives are the β-diketones and the keto acid esters, particularly acetyl acetone and acetoacetic ester. Also of particular interest are the ketoalcohols such as diacetone alcohol.

The proportion of additive employed should be at least .001% by weight of complex-former or chelate-former in the silicone rubber stock. The maximum proportion of additive is established as a practical matter rather than on operability. When more than about 1% by weight of additive is employed the loss of additive through evaporation during vulcanization effectively reduces the amount of additive present to below 1% by weight but a distinct reduction in physical properties realized in the vulcanized rubber results from use of more than 1% by weight of the additive. The preferred range of proportions is from .001 to .1% by weight complex- or chelate-former in the rubber stock mass.

The silicone rubber stocks employed are standard formulations known in the art. Such stocks comprise 100 parts by weight diorganosiloxane polymer, 10 to 200 parts by weight filter and less than 5 parts by weight organic peroxide. In general the diorganosiloxane polymers are polymers of over 5,000 cs. viscosity at 25° C. and are comprised of units of the formula RR'SiO where each R is a monovalent hydrocarbon radical or halogenated monovalent hydrocarbon radical and each R' is a lower alkyl radical of 1 to 6 carbon atoms. The fillers can be inorganic such as powdered metal oxides, silicas, glass fibers and so forth or organic such as cork dust, wood flour and so forth. The preferred fillers are silicas including diatomaceous earth, quartz flour, fume silica, silica aerogels and silica xerogels. The operable peroxides include benzoyl peroxide, tert-butyl perbenzoate, dichlorobenzoyl peroxide, dicumyl peroxide, tert-butyl peracetate, tert-butyl peroxide and other organic peroxides. Heat stability additives, pigments, extenders, compression set additives, oxidation resistance additives and other known additives employed in amounts less than 5% by weight based on the weight of the polymer, can also be present in the silicone rubber stocks.

The silicone rubber stock is prepared by any desired mixing means. The stock may be base-heated which comprises preheating the stock in the absence of the vulcanizing agent to remove volatile materials which may be present. The complex-former or chelate-former is added before vulcanization and is thoroughly mixed through the stock. The rubber stock is then molded, sheeted or otherwise formed and vulcanized by heating to activate the peroxide vulcanizing agent. Generally vulcanization temperatures in the range 100° C. to 200° C. are effective. The silicone rubber can then be cured by further heating as desired.

The following examples are included herein to aid in understanding this invention. The invention is delineated in the appended claims and is not limited by the examples. All parts and percentages in the examples are based on weight unless otherwise specified.

Example 1

A sample of silicone rubber stock was prepared by milling together 100 parts of polymeric dimethylsiloxane gum, 40 parts fume silica and 2.8 parts of a 50% dispersion of benzoyl peroxide in dimethylsiloxane fluid. The stock was divided into equal portions A and B. Portion A was employed without additive, and .05 part of acetyl acetone per 100 parts silicone rubber stock was thoroughly milled into portion B. Sheets of 1 mm. thickness were prepared from each of the portions and the sheets were vulcanized by heating in a press at 110° C. and under 5 kg./cm.² pressure for 10 minutes. The rubber sheets were cured by heating in an air circulating oven for 12 hours at 150° C. followed by another 12 hours at 200° C. The sheets were cut into cubes with 1 mm. edges. The cubes were added to dihydrostreptomycin to give 10% silicone rubber in the antibiotic. Cubes from A were mixed with one sample of antibiotic and from B with another sample. The antibiotic-silicone rubber mixtures were sealed in glass ampoules and stored for 8 days at 45° C. After storage, the antibiotic which had been in contact with the standard silicone rubber (portion A) produced a very turbid solution in distilled water. The antibiotic which had been in contact with silicone rubber containing acetyl acetone dissolved readily to form a water-clear solution in distilled water.

Example 2

Example 1 was repeated employing acetoacetic ester and diacetone alcohol in place of the acetyl acetone and the results achieved were fully equivalent to those observed in Example 1.

Example 3

When Example 1 was repeated employing .005 part of diacetyldioxime, α-benzoinoxime and sym-diphenyl carbazide in place of the .05 part of acetylacetone, the results achieved were similar.

That which is claimed is:

1. A silicone rubber stock consisting essentially of 100 parts by weight of an essentially diorgano-siloxane polymer of the unit formula RR′SiO where each R is a monovalent radical selected from the group consisting of hydrocarbon radicals and halogenated hydrocarbon radicals and each R′ is an alkyl radical of less than 7 carbon atoms, 10–200 parts by weight of a filler and up to 5 parts by weight organic peroxide vulcanizing agent and containing .001 to 1% by weight based on the silicone rubber stock of an additive selected from the group consisting of aliphatic diketones, keto alcohols and ketone acid esters.

2. A silicone rubber stock consisting essentially of 100 parts by weight of an essentially diorgano-siloxane polymer of the unit formula RR′SiO where each R is a monovalent radical selected from the group consisting of hydrocarbon radicals and halogenated hydrocarbon radicals and each R′ is an alkyl radical of less than 7 carbon atoms, 10–200 parts by weight of a filler and up to 5 parts by weight organic peroxide vulcanizing agent and containing .001 to 1% by weight based on the silicone rubber stock of acetylacetone.

3. The rubber stock of claim 1 wherein the additive is diacetone alcohol.

4. The rubber stock of claim 1 wherein the additive is diacetyl dioxime.

5. The rubber stock of claim 1 wherein the additive is aceto-acetic ester.

References Cited in the file of this patent

UNITED STATES PATENTS

| | | |
|---|---|---|
| 2,666,041 | Pfeifer | Jan. 12, 1954 |
| 2,728,743 | Warrick | Dec. 27, 1955 |
| 2,938,010 | Bluestein | May 24, 1960 |

FOREIGN PATENTS

| | | |
|---|---|---|
| 1,077,355 | Germany | Mar. 10, 1960 |

UNITED STATES PATENT OFFICE
CERTIFICATE OF CORRECTION

Patent No. 3,143,519 August 4, 1964

Siegfried Nitzsche et al.

It is hereby certified that error appears in the above numbered patent requiring correction and that the said Letters Patent should read as corrected below.

Column 2, line 34, for "filter" read -- filler --; line 64, for "200°" read -- 220° --.

Signed and sealed this 30th day of March 1965.

(SEAL)
Attest:

ERNEST W. SWIDER
Attesting Officer

EDWARD J. BRENNER
Commissioner of Patents